United States Patent [19]

Eichenauer et al.

[11] Patent Number: 4,617,358

[45] Date of Patent: Oct. 14, 1986

[54] PROCESS FOR THE PRODUCTION OF HIGH MOLECULAR WEIGHT THERMOPLASTIC RESINS

[75] Inventors: Herbert Eichenauer, Dormagen; Karl-Heinz Ott, Leverkusen, both of Fed. Rep. of Germany

[73] Assignee: Bayer Aktiengesellschaft, Leverkusen, Fed. Rep. of Germany

[21] Appl. No.: 739,280

[22] Filed: May 30, 1985

[30] Foreign Application Priority Data

Jun. 8, 1984 [DE] Fed. Rep. of Germany ....... 3421354

[51] Int. Cl.$^4$ .............................................. C08F 2/26
[52] U.S. Cl. ...................................... 526/81; 526/210; 526/212
[58] Field of Search ........................... 526/81, 210, 212

[56] References Cited

U.S. PATENT DOCUMENTS

| | | | |
|---|---|---|---|
| 3,755,225 | 8/1973 | Pierce, Jr. et al. | 526/212 X |
| 4,071,675 | 1/1978 | Yu et al. | 526/212 X |
| 4,076,920 | 2/1978 | Mikofalvy et al. | 526/88 X |
| 4,093,581 | 6/1978 | Anderson | 526/207 X |
| 4,182,820 | 1/1980 | Curfman et al. | 526/212 |
| 4,186,259 | 1/1980 | Bush et al. | 526/212 X |
| 4,267,090 | 5/1981 | Heimberg et al. | 526/81 X |
| 4,286,081 | 8/1981 | Mikofalvy et al. | 526/212 X |
| 4,310,649 | 1/1982 | Sjolin | 526/216 X |

FOREIGN PATENT DOCUMENTS 3242088 5/1984 Fed. Rep. of Germany ........ 526/81

OTHER PUBLICATIONS

Processes for Major Addition-Type Plastics and Their Monomers; Albright; 1974; pp. 250-251.
J. Polym. Sci.; Polymer Letters, 11, 503-513 (1973) Ugelstad et al.
Makromol. Chem., 175, 507-521 (1974), Ugelstad et al.

*Primary Examiner*—Paul R. Michl
*Attorney, Agent, or Firm*—Connolly & Hutz

[57] ABSTRACT

A process for the production of uncross-linked vinyl polymers in two steps, a mixture of vinyl monomer, aliphatic hydroxyl compound, water and initiator being prepolymerized in step (A) and polymerization being completed in step (B) after the addition of more vinyl monomer and an emulsifier.

2 Claims, No Drawings

PROCESS FOR THE PRODUCTION OF HIGH MOLECULAR WEIGHT THERMOPLASTIC RESINS

This invention relates to a process for the production of high molecular weight uncross-linked vinyl polymers by emulsion polymerization.

While, in radical initiated polymerization reactions, molecular weight may readily be limited as required by the addition of regulators, such as mercaptans or halogenated hydrocarbons, there have hitherto been only a few processes which allow molecular weight to be increased.

However, polymers of very high molecular weight are of interest for certain applications, for example in coating materials, for the production of tiles or as viscosity regulators.

The simplest method of obtaining polymers of high molecular weight is to add a cross-linking compound to the monomer or monomer mixture. However, the polymers obtained are generally no longer soluble and have the properties of macromolecular networks, which are not always desired.

In some cases, high molecular weight polymers can be obtained by emulsion polymerization with the aid of suitable additives or by using particular initiator systems. British Pat. No. 600.905, for example, describes the addition of crotonic acid in the polymerization of vinyl halides or vinylidene halides, U.S. Pat. No. 2,552,328 describes the addition of certain phenolic compounds in the polymerization of ethyl acrylate and U.S. Pat. No. 3,459,699 describes the use of dicyclopentadiene in the production of acrylic polymers.

Suitable initiator systems for the production of high molecular weight emulsion polymers are recommended by D. Mikulasova et al. In European Polymer Journal, 10, 551–556, (1974) (mixtures of oxidized isotactic polypropylene and triethylene tetramine) and in Japanese Pat. Nos. 52 084 269 and 57 117 502 (peroxide/amine mixtures in each case), while DOS No. 19 64 915 describes the use of very small quantities of persulphate.

However, the above-described methods of obtaining high molecular weight uncross-linked vinyl polymers by emulsion polymerization are not generally applicable, give unsatisfactory yields or require the use of specialised reagents.

In the present context, "emulsion polymerization" is to be understood to be polymerization carried out in the aqueous phase in the presence of surface-active substances, i.e. emulsifiers, such as alkali metal salts of long-chain alkyl sulphonic acids or long-chain fatty acids.

It is also known that, instead of using an emulsifier on its own, it is possible to use a prehomogenized mixture of an emulsifier and a long-chain alcohol. Examples of the use of mixed emulsifier systems of this type in the polymerization of vinyl chloride may be found, for example, in DOS Nos. 26 28 665, 26 29 655 and 27 42 178 or, for the polymerization of styrene, in J. Ugelstad et al., J. Polym. Sci., Polymer Letters, 11, 503–513, (1973) and in Makromol. Chem., 175, 507–521, (1974).

The present invention relates to a process for the production of high molecular weight uncross-linked vinyl polymers by emulsion polymerization, wherein in process step (A), a mixture of:

(a) from 1 to 20 parts, by weight, of vinyl monomer or monomer mixture;

(b) from 0.1 to 3.0 parts, by weight, of a hydroxyl group-containing, $C_8$–$C_{22}$ aliphatic hydrocarbon compound; and (c) from 80 to 400 parts, by weight, of water; has added to it at temperatures of from 50° to 65° C., preferably from 55° to 60° C., (d) from 0.05 to 0.5 part, by weight, of a water-soluble initiator or initiator system;

and, in process step (B), which is carried out after a reaction time of from 5 minutes to 1 hour at that temperature, (e) from 80 to 99 parts, by weight, of vinyl monomer or monomer mixture; and (f) from 0.1 to 3.0 parts, by weight, of an anionic emulsifier in the form of an aqueous solution; are separately added to the reaction mixture and polymerization completed over a period of from 1 to 10 hours.

Suitable vinyl monomers are compounds which may be polymerized in emulsion to form thermoplastic resins, for example aromatic vinyl compounds corresponding to general formula (I) below or compounds corresponding to general formula (II) below or mixtures thereof:

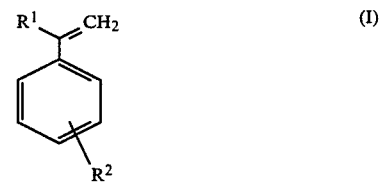

in general formulae (I) and (II), $R^1$ represents hydrogen or methyl: $R^2$ represents hydrogen, halogen or $C_1$–$C_3$ alkyl in the ortho, meta or para position: $R^3$ represents hydrogen or ethyl; and X represents a cyano (CN), ester ($COOR^4$) or amide ($CONR^5R^6$) group (wherein $R^4$ represents hydrogen or $C_1$–$C_4$ alkyl; and $R^5$ and $R^6$ independently represent hydrogen, phenyl or alkyl containing from 1 to 4 carbon atoms).

Examples of compounds corresponding to general formula (I) are styrene, α-methyl styrene, p-methyl styrene and vinyl toluene. Examples of compounds corresponding to general formula (II) including (meth) acrylonitrile and methyl (meth) acrylate. Other suitable monomers are, for example, vinyl acetate or N-phenyl maleic imide.

Preferred monomers are mixtures of styrene and acrylonitrile and also mixtures of styrene, acrylonitrile and methyl methacrylate.

"Hydroxyl group-containing aliphatic hydrocarbon compounds" are to be understood to be mono- or di-ols of $C_8$–$C_{22}$ hydrocarbons, for example 1-octanol, 1-nonanol, 1-decanol, 1,10-decane diol, 9-decen-1-ol, 1-undecanol, 10-undecen-1-ol, 1-dodecanol, 1,2-dodecane diol, 1,12-dodecane diol, 1-tridecanol, 1-tetradecanol, 1-pentadecanol, 1-hexadecanol, 2-hexadecanol, 1,2-hexadecanol, 1,16-hexadecane diol, 9-octadecen-1-ol, 1-octadecanol, 3,7,11,15-tetramethyl-2-hexadecen-1-ol, 1-docosanol or mixtures thereof, compounds containing from 12 to 18 carbon atoms being preferred. The quantities used amount to from 0.1 to 3.0 parts, by weight, preferably from 0.5 to 2.0 parts, by weight, based in each case on 100 parts, by weight, of monomer.

The water-soluble initiators or initiator systems used are, for example, alkali metal salts or the ammonium salt of peroxodisulphuric acid or combinations of these compounds with reducing compounds, such as sodium dithionite or the sodium salt of hydroxymethane sulphinic acid. The initiators or initiator systems are used in quantities of from 0.05 to 0.5 parts, by weight, (based on 100 parts by weight, of monomer). Potassium peroxodisulphate is preferably used as the initiator.

Suitable anionic emulsifiers are, for example, the sodium, potassium or ammonium salts of long-chain fatty acids containing from 10 to 20 carbon atoms, for example potassium oleate, salts of disproportionated abietic acid, salts of long-chain benzene sulphonates, for example sodium n-dodecylbenzene sulphonate, and salts of long-chain sulphonic acids, for example the sodium salts of $C_9$–$C_{18}$ alkyl sulphonic acid mixtures.

1-octadecanol or 9-octadecen-1-ol or a mixture thereof is preferably used as the hydroxyl group-containing aliphatic hydrocarbon compound, while the sodium salt of dodecylbenzene sulphonic acid is preferably used as the anionic emulsifier.

The essential feature of the process according to the present invention is that only part of the monomer is polymerized in step (A) which is carried out at from 50° to 65° C. in the presence of water and a hydroxyl group-containing hydrocarbon compound and in the absence of emulsifiers, the remainder of the monomer and the emulsifier solution being separately added thereafter in step (B).

The process according to the present invention has the advantage over known methods for the production of high molecular weight vinyl polymers that it is easy to carry out and has a broad scope of application. The vinyl polymers obtained by the process according to the present invention are uncross-linked, i.e. form completely clear solutions in suitable solvents, and generally have intrinsic viscosities of from 300 to 1500 cm³/g, preferably from 350 to 1000 cm³/g, (as measured in dimethyl formamide at 25° C.). Such intrinsic viscosities correspond to average molecular weights ($M_w$), determined by gel permeation chromatography or light scattering, of from 800,000 to 10,000,000.

EXAMPLES AND COMPARISON EXAMPLES

In the following Examples. Intrinsic viscosity was measured using an Ubbelohde viscosimeter at 25° C. in dimethyl formamide as solvent and the weight average molecular weights by light scattering in dimethyl formamide using an instrument of the Fica 50-type manufactured by ARL (France).

EXAMPLE 1

In a reactor, 360 g of styrene, 140 g of acrylonitrile and 50 g of 1-octadecanol are dispersed, with stirring, in 4090 g of water and heated to 58° C., followed by the addition of 7.5 g of potassium persulphate (dissolved in 660 g of water). After stirring for 30 minutes at that temperature, a mixture of 3240 g of styrene and 1260 g of acrylonitrile and, through a separate inlet, a solution of 25 g of the sodium salt of n-dodecylbenzene sulphonic acid in 1250 g of water are added to the reaction mixture over a period of 4 hours. Following an after-reaction, the latex is coagulated using magnesium sulphate/acetic acid and the polymer powder obtained is dried in vacuo at 70° C. The copolymer thus produced in a yield of 91% has a molecular weight ($M_w$) of 3,130,000.

COMPARISON EXAMPLES A to F

The reaction described in Example 1 is repeated using the same quantities, the same times and the same temperature, the difference being that the 1-octadecanol and the sodium-n-dodecylbenzene sulphonate are respectively used in the process step indicated in Table 1.

TABLE 1

Effect of the emulsifier addition on the intrinsic viscosity of the resulting polymer

| Example | Emulsifier component introduced into the reactor in step (A) | Emulsifier component added parallel to the monomer in step (B) | Intrinsic viscosity of the resulting polymer (as measured in dimethyl formamide at 25° C.) |
|---|---|---|---|
| 1 | 1-octadecanol | Na n-dodecylbenzene sulphonate solution | 772 cm³/g |
| A (comparison) | Na n-dodecylbenzene sulphonate solution + 1-octadecanol | — | 260 cm³/g |
| B (comparison) | Na n-dodecylbenzene sulphonate solution | 1-octadecanol | 238 cm³/g |
| C (comparison) | — | Na n-dodecylbenzene sulphonate solution + 1-octadecanol | 232 cm³/g |
| D (comparison) | Na n-dodecylbenzene sulphonate solution (50% of the total quantity) | Na n-dodecylbenzene sulphonate solution (50% of the total quantity) | 274 cm³/g |
| E (comparison) | Na—n-dodecylbenzene sulphonate solution | — | 272 cm³/g |
| F (comparison) | — | Na n-dodecylbenzene sulphonate solution | 285 cm³/g |

As may be seen from the Table, it is only the process according to the present invention which gives a polymer having a high intrinsic viscosity, i.e. a very high average molecular weight.

EXAMPLE 2

A mixture of 270 g of styrene, 105 g of acrylonitrile and 60 g of 9-octadecen-1-ol is dispersed, with stirring, in 4090 g of water and heated to 58° C., followed by the addition of 7.5 g of potassium persulphate (dissolved in 660 g of water). After stirring for 45 minutes at that temperature, a mixture of 3330 g of styrene and 1295 g of acrylonitrile and, through a separate inlet, a solution of 20 g of the sodium salt of n-dodecylbenzene sulphonic acid in 1250 g of water are added to the reaction mixture over a period of 6 hours at the temperature of 58° C. Following an after-reaction, the latex is coagulated using magnesium sulphate/acetic acid and the polymer powder obtained dried in vacuo at 70° C. (yield 94%). The intrinsic viscosity of the copolymer is 926 cm³/g.

EXAMPLE 3

In a reactor, 262.5 g of p-methylstyrene, 87.5 g of acrylonitrile and 40 g of 9-octadecen-1-ol are dispersed, with stirring, in 4590 g of water and heated to 60° C., followed by the addition of 7.5 g of potassium persulphate (dissolved in 750 g of water). After stirring for 45 minutes, a mixture of 3487.5 g of p-methylstyrene and 1162.5 g of acrylonitrile and, through a separate inlet, a solution of 20 g of the sodium salt of n-dodecylbenzene sulphonic acid in 1410 g of water are added to the reaction mixture over a period of 4 hours. Following an after-reaction, the latex is coagulated using magnesium sulphate/acetic acid and the polymer dried in vacuo at 70° C. (yield 94%). The intrinsic viscosity of the copolymer is 465 cm$^3$/g.

EXAMPLE 4

A mixture of 125 g of styrene, 50 g of acrylonitrile and 75 g of methylmethacrylate is dispersed together with 60 g of 1-octadecanol in 5260 g of water, followed by heating to 58° C. After the addition of 7.5 g of potassium persulphate (dissolved in 850 g of water), the mixture is stirred for 30 minutes at the temperature of 58° C. A mixture of 2375 g of styrene, 950 g of acrylonitrile and 1425 g of methylmethacrylate and, through a separate inlet, a solution of 25 g of the sodium salt of n-dodecylbenzene sulphonic acid in 1605 g of water are then continuously added over a period of 4 hours. Following an after-reaction, the latex is coagulated using magnesium sulphate/acetic acid and the polymer powder dried in vacuo at 70° C. (yield 87%). The terpolymer has an intrinsic viscosity of 546 cm$^3$/g.

We claim:
1. A process for the production of high molecular weight uncross-linked vinyl polymers by emulsion polymerization, consisting essentially of,
   (a) from 1 to 20 parts, by weight, of vinyl monomer selected from styrene, α-methyl styrene, p-methyl styrene, vinyl toluene, (meth) acrylonitrile, methyl (meth) acrylate, vinyl acetate, N-phenyl maleic imide or a mixture thereof;
   (b) from 0.1 to 3.0 parts, by weight, of a mono- or di-ol of a $C_8$–$C_{22}$ aliphatic hydrocarbon compound; and
   (c) from 80 to 400 parts, by weight, of water;
   (d) from 0.05 to 0.5 parts, by weight, of a water soluble initiator or initiator system at a temperature of from 50° to 65° C. to form a reaction mixture;
and, in process step (b), which is carried out after a reaction time of from 5 minutes to 1 hour at that temperature separately adding to the reaction mixture,
   (e) from 80 to 99 parts, by weight, of vinyl monomer or monomer mixture; and
   (f) from 0.1 to 3.0 parts, by weight, of an anionic emulsifier in the form of an aqueous solution; and reacting over a period of from 1 to 10 hours until polymerization is completed.

2. A process as claimed in claim 1, wherein 1-octadecanol or 9-octadecen-1-ol or a mixture thereof is used as the aliphatic hydrocarbon.

* * * * *